United States Patent [19]
Stammers

[11] Patent Number: 5,918,843
[45] Date of Patent: Jul. 6, 1999

[54] SCAFFOLD BRACKET

[76] Inventor: Terrance H. Stammers, 7375 Buller Ave., Upper Burnaby, British Columbia, Canada, VSJ456

[21] Appl. No.: 08/820,581

[22] Filed: Mar. 19, 1997

[51] Int. Cl.$^6$ ..................................................... A47B 96/06
[52] U.S. Cl. ..................................... 248/230.6; 248/316.6; 248/231.71; 108/28
[58] Field of Search ................................. 248/201, 230.6, 248/229.22, 229.12, 228.3, 316.4, 238, 207, 220.1, 229.1, 229.16, 229.2, 226.11, 228.1, 231.71, 231.85; 108/28

[56] References Cited

U.S. PATENT DOCUMENTS

| | | | |
|---|---|---|---|
| 1,631,355 | 6/1927 | Baldwin | 248/316.6 |
| 1,821,488 | 9/1931 | Wetherbee | 248/231.71 |
| 2,188,701 | 1/1940 | Brullhardt | 248/157 |
| 2,628,051 | 2/1953 | Anderson | 248/231.71 |
| 2,814,455 | 11/1957 | Rainey | 108/28 |
| 2,998,476 | 8/1961 | Nix | 174/139 |
| 3,131,900 | 5/1964 | Anderson et al. | 248/231.71 |
| 3,363,867 | 1/1968 | Zackrisson | 248/250 |
| 3,385,400 | 5/1968 | Whitsett | 248/246 |
| 3,601,295 | 8/1971 | Lowe | 224/42.45 R |
| 3,949,880 | 4/1976 | Fortunato | 211/86 |
| 3,970,277 | 7/1976 | Riblet | 248/246 |
| 4,846,803 | 7/1989 | Emerson | 604/263 |
| 5,039,052 | 8/1991 | Carafice | 248/309.1 |
| 5,303,891 | 4/1994 | Powers | 248/246 |
| 5,316,253 | 5/1994 | Flathau et al. | 248/246 |
| 5,370,570 | 12/1994 | Harris | 248/231.71 |
| 5,433,414 | 7/1995 | Vieira | 248/316.4 |

*Primary Examiner*—Leslie A. Braun
*Assistant Examiner*—Kimberly Wood
*Attorney, Agent, or Firm*—Patent & Trademark Services; Joseph H. McGlynn

[57] ABSTRACT

A clamp assembly for attachment of a scaffolding to an exposed structural beam or a vertical post comprising an L-shaped bracket piece and a scaffolding support clamp. The later piece is attached to an exposed vertical structural support by a screw threaded bolt, while the L-shaped bracket piece is attached to the scaffold or a support for a scaffold by any conventional fastener such as screws or nails or both. The clamp is equipped with a plate which can rotate through small angles to allow the scaffold to be erected in a perfectly horizontal orientation.

5 Claims, 1 Drawing Sheet

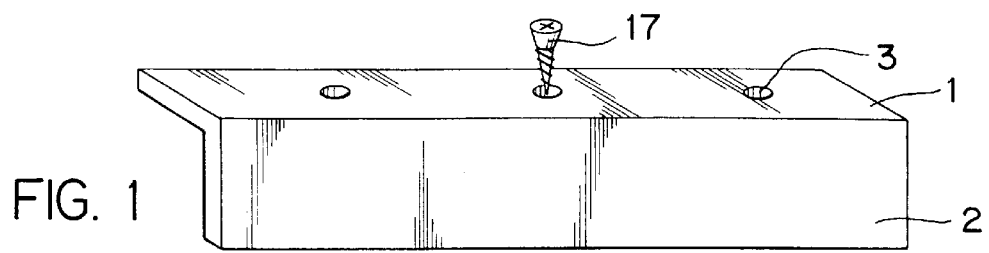
FIG. 1
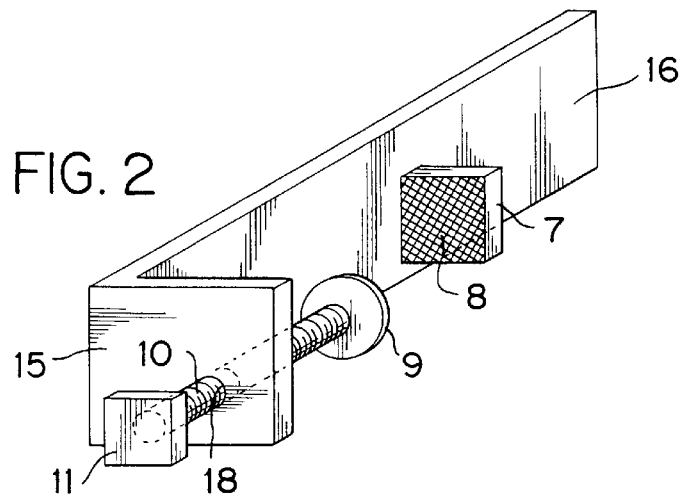
FIG. 2
FIG. 3
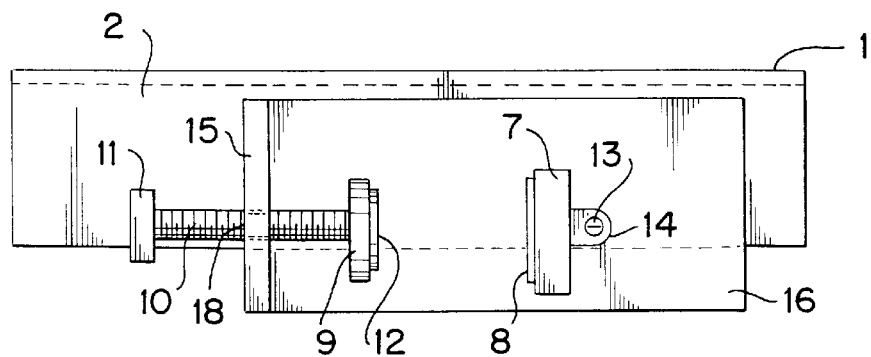
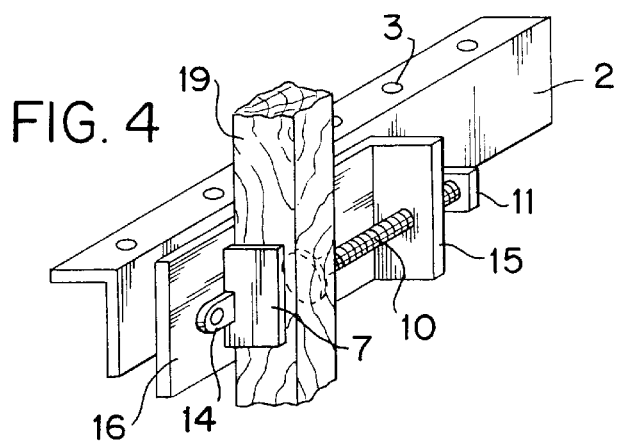
FIG. 4

SCAFFOLD BRACKET

BACKGROUND OF THE INVENTION

This invention relates generally to supporting brackets and, more particularly, to brackets used to erect scaffolding.

DESCRIPTION OF THE PRIOR ART

Numerous inventions relating to scaffold brackets have been proposed in the prior art. Often, they seek to form an apparatus which will allow the connection of a scaffold to the side of a building or wall. U.S. Pat. No. 5,303,891 discloses a bracket for supporting a length of lumber adjacent a vertical member such as a stud. The bracket has a central bar to which a pair of end bars are welded. The end bars extend in both directions away from the central bar. The central bar is then placed adjacent the face of a vertical stud and the end bars are sufficiently separated so that the bracket may be rotated a small amount. The bracket is then rotated and a length of lumber is then inserted between the upper and lower bars in a cantilevered member and held securely so that it may be worked on, such as cut to length, along the cantilevered ends.

U.S. Pat. No. 3,385,400 discloses a scaffold bracket of a type adapted to be supported from a scaffold and to have planks placed thereon for workmen to stand on while doing work.

U.S. Pat. No. 3,970,277 discloses an improved self-locking scaffold bracket employing a load activated lock in combination with a foot operated hoisting device which may be hoisted without lost motion relative to the support. The scaffold bracket utilizes a rigid frame directly supported upon a lock which clamps to an upright post. The scaffold can be raised by a hoisting device of the block and tackle type or by a foot operated hoisting mechanism of the type which "walks" up the post.

U.S. Pat. No. 5,316,253 discloses a scaffold bracket comprising a generally triangular shaped brace having an attachment leg, a plank supporting leg, and a brace leg. The attachment leg is adapted to be secured to an outer surface of the concrete form, the plank supporting leg extends generally transversely of the attachment leg, and the brace leg extends from the attachment led to the plank supporting leg at an acute angle to both the attachment leg and the plank supporting leg.

Most of the prior art inventions were directed only at erecting and supporting scaffolds in non-permanent manners against finished structures. There remains a need for a device which utilizes the presence of exposed structural beams to hold and support scaffolding in a cost efficient fashion.

SUMMARY OF THE INVENTION

The present invention provides a means for attachment of a scaffolding to an exposed structural beam or a vertical post comprising an L-shaped bracket piece and a scaffolding support clamp. The later piece is attached to an exposed vertical structural support by a screw threaded bolt, while the L-shaped bracket piece is attached to the scaffold or a support for a scaffold by any conventional means such as screws or nails or both. The clamp is equipped with a plate which can rotate through small angles to allow the scaffold to be erected in a perfectly horizontal orientation.

Accordingly, it is an object of this invention to provide a means for the erection and support of a traditional scaffold apparatus by utilizing a scaffold bracket and clamp.

It is a further object of this invention to allow said scaffold apparatus to be erected against walls or areas with exposed vertical structural pieces.

Finally, it is an object of this device that said clamp be maneuverable so that the scaffold may be positioned in an exactly horizontal condition.

BRIEF DESCRIPTION OF THE DRAWINGS

FIG. 1 is a view of the bracket piece of the invention.

FIG. 2 is a perspective view of the clamp piece of the invention.

FIG. 3 is a front view of the bracket and clamp pieces as they are assembled together.

FIG. 4 is a perspective view of the invention as it is mounted for use on a structural member.

DESCRIPTION OF THE PREFERRED EMBODIMENT

Referring now to the drawings, there is shown in FIG. 1 one part of the present invention comprising a length of an L-shaped bracket. The bracket is formed from two equally sized rectangular pieces 1, 2 that are connected in a perpendicular fashion such that the longer sides of each piece 1, 2 are joined, thereby forming an object with an L-shaped cross-section. The bracket can be formed as an integral or unitary element. The horizontal portion 1 has a plurality of holes 3 which can receive nails or screws 17 to secure the bracket to a scaffold or a scaffold support.

FIG. 2 shows the second part of the invention comprising a plate 15 and a plate 16 oriented in a perpendicular fashion, and a clamp assembly 7, 8, 9, 10, 11. The two plates 15, 16 are oriented so that they form an L-shape in plan view. Plate 15 has a hole 18 offset from the center which is threaded in a conventional fashion. The hole 18 is offset to compensate for the weight of the horizontal scaffolding when it is placed on the leg 1.

The clamp assembly consists of a mounted support piece 7 which is attached to piece 16 in any conventional manner, and a movable, pressure piece 10 in the shape of a threaded bolt, which is threaded to a size corresponding to the threaded hole 18. The mounted support piece 7 is rectangular in nature (although other shapes could be used) and is attached perpendicularly to plate 16 and in a parallel manner to the plate 15. Piece 7 has on it a non-slip, high friction coating 8 on the side facing the plate 15.

The movable piece 10 is placed through the threaded hole 18 so that one end is perpendicularly facing the mounting piece 7 and the other end is outside of the L-shape formed by the two plates 15, 16. At the end of the movable piece 10 facing the mounted piece 7 is attached a circular plate 9 which is oriented so that it faces the nonslip surface 8. The face also has a non-slip surface 12 as shown in FIG. 3. At the end of the threaded piece 10 opposite the mounted piece 7 is a handle piece 11 which is shown in the form of a square in the drawings. It is to be understood that the handle piece 11 may take on any form which allows the control of movement of the threaded piece 10.

FIG. 3 shows the nature of the connection of the mounting piece 7 to the plate 16. The support piece 7 has connected to the side opposite the non-slip surface 8 a small piece 13 which is oblong in shape and emanates from the support piece 7 and runs along the surface of the plate 16. At the end of the piece 13 is a hole 14 which goes through the plate 16 as well, and can be used to secure 7 to 16.

Clamp 15, 16 can be attached to the L-shaped support piece 1, 2 by welding the two pieces together. However, it should be understood that other methods can be used to secure the two elements without departing from the scope of the invention.

FIG. 4 shows that in use, the clamp 15, 16 is placed against an exposed vertical structural member 19, such as a 4×4 post, so that the corner formed by the L-shaped clamp fits against the edge of the post. The threaded bolt 10 is then tightened until the clamp 15, 16 is securely fastened to the post. Since the plate 7 can rotate slightly with respect to the plate 16, the clamp has an automatic self aligning feature in case the post is not positioned in a true vertical plane.

Once the clamp is secured, a horizontal scaffold (not shown) or a support for a scaffold can be positioned on the horizontal arm 1 and fastened with screws or nails 17 through the apertures 3. It should be noted that the assembly of only one clamp 15, 16 has been described. This is because it is not always necessary to use a pair of the clamps at opposite ends to support the horizontal scaffold. The second end of the scaffold can be supported by a second clamp assembly 1, 2, 15, 16, or it can be supported by a step ladder, cinder blocks or any other support mechanism which will adequately support the end of the scaffold.

The composition and construction of the members of the invention are best determined by the function of each component. The L-shaped support member 1, 2 and clamp bracket 7, 15, 16 are best made of a strong metal, as they are required to withstand the stresses and strains imposed on a normal scaffold construction. The two parts 1, 2 and 15, 16 are preferably constructed as unitary members, though they might be separate pieces which are connected by a conventional welding process. The support member 7 and the threaded piece 10 are also best suited to a strong metal composition, as both will be subjected to the stresses and strains placed on a scaffold assembly. In all of these cases, a strong steel construction would be the ideal metal composition, though any other material which satisfies the aforementioned conditions would be acceptable.

The non-slip surfaces 8, 12 can be any conventional non-slip material, such as rubber, and are shaped so as to increase friction when in contact with the post member 19. The non-slip surfaces could also be raised areas consisting of protrusions or even knurled surfaces. Essentially any type of roughened surface which will increase the holding power of the clamp can be used.

Although the Scaffold Bracket and the method of using the same according to the present invention have been described in the foregoing specification with considerable detail, it is to be understood that modifications may be made to the invention which do not exceed the scope of the appended claims, and modified forms of the present invention done by others skilled in the art to which the invention pertains will be considered infringements of the invention when those modified forms fall within the claimed scope of this invention.

What I claim as my invention is:

1. A clamp assembly for erecting a scaffold, comprising:

A first part adapted to be attached to a vertical support, said first part having first and second legs forming an L-shape, said legs being oriented perpendicular to each other, one of said legs having a threaded aperture therethrough, a threaded member extending through said threaded aperture, said threaded member having an operating member on one end and a pressure plate on another end, another of said legs having a pressure platform secured thereto, said clamp assembly having a second part, said second part having first and second legs forming an L-shape, one of said legs of said second part having a plurality of apertures therethrough, means for securing said first part to said second part, and wherein said clamp assembly contains means for allowing said pressure platform to swivel with respect to said another of said legs.

2. The clamp assembly for erecting a scaffold as claimed in claim 1, wherein said threaded aperture is positioned off center on said one of said legs.

3. A method of using said clamp assembly for erecting a scaffold as claimed in claim 1, wherein said method comprises:

attaching a first clamp assembly to the vertical support by attaching said first part to a vertical support by passing said first and second legs, on said first part, around said vertical support, turning said threaded member until said vertical support is firmly clamped between said pressure platform and said pressure plate, providing a second part, placing a first end of a horizontal member on one of said legs of said second part, placing a second end of said horizontal member on said second part, passing fastening means through said apertures in one of said legs on said second part and into said horizontal member.

4. The method of using said clamp assembly for erecting a scaffold as claimed in claim 3, wherein said second part is another clamp assembly.

5. The clamp assembly for erecting a scaffold as claimed in claim 1, wherein said pressure platform and pressure plate have non-slip surfaces.

* * * * *